United States Patent
Ruth et al.

[11] Patent Number: 6,062,535
[45] Date of Patent: May 16, 2000

[54] EXHAUST GAS RECIRCULATION VALVE WITH VARIABLE FLOW AREA

[75] Inventors: Michael J. Ruth, Franklin; Josh S. Shao, Columbus; Paul R. Miller, Columbus; Long K. Hwang, Columbus, all of Ind.

[73] Assignee: Cummins Engine Company, Inc., Columbus, Ind.

[21] Appl. No.: 08/798,922

[22] Filed: Feb. 12, 1997

[51] Int. Cl.⁷ .............................. F02M 25/07; F16K 47/08
[52] U.S. Cl. .................... 251/123; 251/61.5; 123/568.27
[58] Field of Search ...................... 137/625.37; 251/61.5, 251/123, 124; 123/568.26, 568.27

[56] References Cited

U.S. PATENT DOCUMENTS

| | | | |
|---|---|---|---|
| 1,511,302 | 10/1924 | Schwetzer | 137/625.37 |
| 2,087,621 | 7/1937 | Lorraine | 251/124 |
| 2,219,324 | 10/1940 | Lee | 251/123 |
| 3,175,473 | 3/1965 | Boteler et al. | 251/61.5 X |
| 3,902,696 | 9/1975 | Ito et al. | 251/6.5 |
| 3,981,283 | 9/1976 | Kaufman | 123/568.27 |
| 4,041,973 | 8/1977 | Rice et al. | 251/61.5 X |
| 4,109,683 | 8/1978 | Strache | 137/625.37 X |
| 4,154,263 | 5/1979 | Cary | 137/625.3 |
| 4,180,100 | 12/1979 | Kolb et al. | 137/625.3 |
| 4,186,702 | 2/1980 | Day et al. | 123/568.27 |
| 4,196,707 | 4/1980 | Stoltman | 123/568.27 |
| 4,237,837 | 12/1980 | Toda et al. | 123/569 |
| 4,239,181 | 12/1980 | Brakebill | 251/61.5 |
| 4,291,660 | 9/1981 | Molyneaux | 123/568 |
| 4,373,497 | 2/1983 | Harmen | 123/571 |
| 4,378,776 | 4/1983 | Nishimori | 123/568.27 X |
| 4,750,466 | 6/1988 | Hibino et al. | 123/568.27 |
| 5,205,537 | 4/1993 | Pfeiffer | 251/205 |
| 5,368,276 | 11/1994 | Pfeiffer | 251/205 |
| 5,460,146 | 10/1995 | Frankenberg | 123/568.21 |
| 5,632,258 | 5/1997 | Tsuzuki et al. | 123/568.27 |

FOREIGN PATENT DOCUMENTS

| | | |
|---|---|---|
| 2553471 | 4/1985 | France . |
| 2690714 | 11/1993 | France . |
| 2651504 | 3/1978 | Germany . |
| 4009923 | 10/1991 | Germany . |
| 57-6164 | 1/1982 | Japan . |
| 4-236861 | 8/1992 | Japan . |
| 7-301155 | 11/1995 | Japan . |
| 9519497 | 7/1995 | WIPO . |

*Primary Examiner*—John Rivell
*Attorney, Agent, or Firm*—Sixbey, Friedman, Leedom & Ferguson; Charles M. Leedom

[57] ABSTRACT

A flow control valve having a controllable flow area which varies with the valve displacement. The flow control valve includes a poppet-type valve element mounted to reciprocate between a closed and open position in a valve cavity formed in a valve housing. The valve housing has an inlet and outlet passage to allow fluid to flow therethrough. A removable insert having a flow passage is positioned in the valve cavity adjacent the poppet-valve for controlling the flow rate of gaseous fluid from the inlet passage to the outlet passage while the poppet valve is in an open position. Movement of the poppet valve from a closed to an open position varies the effective cross-sectional flow area of the flow passage.

20 Claims, 7 Drawing Sheets

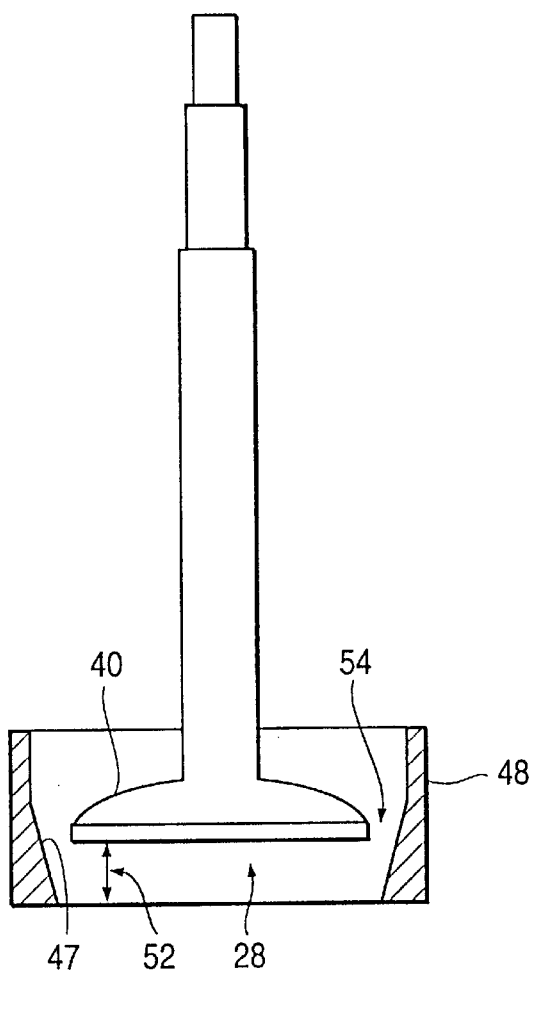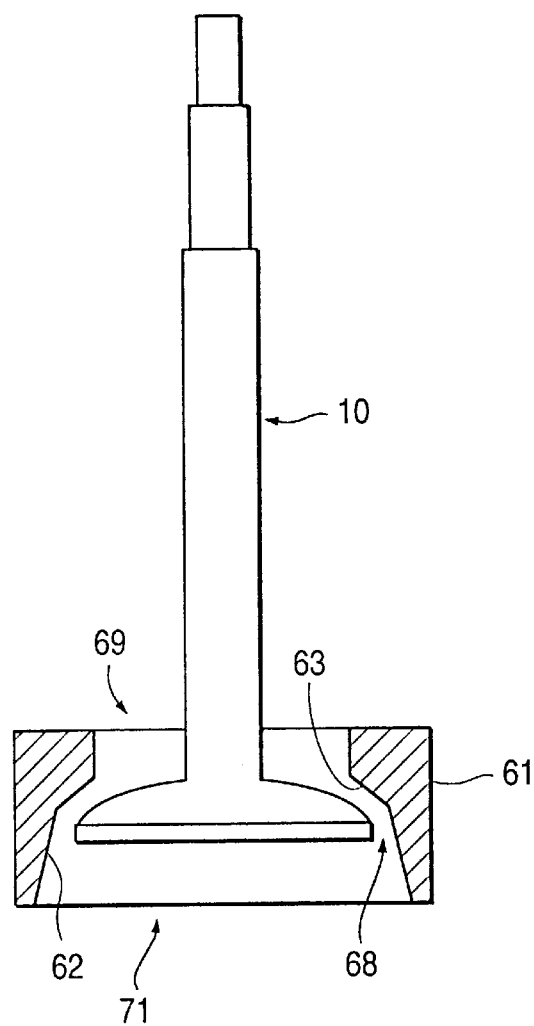

EXHAUST GAS RECIRCULATION VALVE WITH VARIABLE FLOW AREA

TECHNICAL FIELD OF THE INVENTION

The present invention relates to a control valve for use in an internal combustion engine and more particularly, to an exhaust gas recirculation (EGR) valve having a controllable flow area that varies with valve displacement.

BACKGROUND OF THE INVENTION

Improvements in valve designs used in internal combustion engines to control various functions of the engine and to enhance engine performance have been ongoing for many years. The quest for an internal combustion engine having an optimum efficiency has also been on the minds of engine manufacturers over time. By making improvements on valve functionality and design, engine manufacturers are able to solve many problems experienced by their customers and remain competitive in the marketplace.

One aspect of engine performance that has received attention in recent years is exhaust gas recirculation, especially in a diesel engine. In a diesel engine, an excess amount of air is usually introduced into the combustion chamber. Therefore, exhaust gas recirculation operation for a diesel engine must be controlled relative to the excess. Since the amount of excess air decreases in accordance with the increase of engine load, it would be desirable to manufacture a valve device for controlling the amount of gas and air directed to the engine in such a way that the amount of recirculated exhaust gas introduced into the engine intake passageway is decreased while the amount of intake air directed to the engine is increased in accordance with an increasing engine load. In order to effectively control exhaust gas recirculation, the relationship between the load of the engine and the ratio of the amount of recirculated exhaust gas to the total mount of fluid directed to the engine should be determined.

Various types of valve designs exist which utilize geometrically shaped openings to control fluid flow for achieving desired engine operation characteristics. One reference which discloses such a design is U.S. Pat. No. 4,154,263 to Cary. This reference discloses a control valve having a movable valve element positioned in a cylindrical housing with triangularly shaped openings formed therein for variably controlling fluid flow depending on the relative position of the valve element. The apertures may take a variety of shapes to achieve the desired flow characteristics with respect to the stem travel. The valve design of Cary, however, includes apertures formed on the upstream side of the valve which decrease the effective controllability of fluid flow. In addition, the valve element of Cary comprises a spool valve structure which often does not provide an adequate seal along the slidable clearance between the valve element and housing. The spool valve structure of Cary also has many parts and is costly to manufacture which would make it undesirable for many applications.

Two references which disclose an improvement to the Cary design in terms of enhancing flow characteristics are U.S. Pat. Nos. 5,205,537 and 5,368,276, both to Pfeiffer. These references disclose a control valve structure including a control valve element and a flow orifice or port having a variable cross-section (i.e., a teardrop or egg-shaped cross section). Movement of the valve element varies the cross sectional flow area based on the shape of the flow port to provide enhanced area and flow range ability. The valve structures of Pfeiffer, however, are spool valve designs which are costly to manufacture and may not provide adequate sealing in high pressure environments. In addition, the flow port is formed in the valve element instead of the valve body which also increases manufacture and repair costs. Furthermore, the Pfeiffer valve is designed to control the flow of particulate solids and not gaseous fluids generated by an internal combustion engine.

U.S. Pat. No. 4,237,837 to Toda et al. discloses an exhaust gas recirculation control valve for a diesel engine that is designed to achieve a low rate of increase in the flow area of the exhaust gas when the valve is opened from its fully closed position. Toda et al. discloses a complex valve design comprising many parts for merely actuating the valve element. In addition, the valve of Toda et al. does not provide a downstream outlet port formed in a valve cavity which is desirable for effective control of flow characteristics.

It is evident, based on the art discussed above, that the manufacturing industry has yet to develop a simple, inexpensive and compact valve with improved flow control characteristics for effectively controlling the flow of fluid therethrough.

SUMMARY OF THE INVENTION

In view of the foregoing, it is an object of the present invention to provide a flow control valve for effectively controlling EGR flow characteristics in an internal combustion engine.

It is further an object of the present invention to achieve the above object, and to provide a flow control valve that is compact and inexpensive to manufacture.

It is also an object of the present invention to achieve one or more of the above objects, and to further provide a flow control valve that effectively controls the degree to which NOx emissions and other characteristics are reduced or influenced.

It is a further object of the present invention to achieve one or more of the above objects and also provide a flow control valve that includes a poppet valve movable within a flow passage for varying and effectively controlling the cross-sectional flow area of the flow passage.

It is a yet another object of the present invention to achieve one or more of the above objects and also provide a flow control valve that includes removable inserts having different flow altering characteristics.

It is also another object of the present invention to achieve one or more of the above objects and also provide a flow control valve for applications that demand rapid initial opening and finer flow control at higher valve lifts.

It is yet a further object of the present invention to achieve one or more of the above objects and also provide a flow control valve for applications that demand a slower initial opening and finer flow control at lower valve lifts.

These, as well as other objects of the present invention, are achieved by a flow control valve for controlling the flow of gaseous fluids. The valve includes a valve housing having a cavity, an inlet passage, an outlet passage, and a poppet valve positioned in the cavity which includes a reciprocally mounted valve element and a valve seat. The poppet valve is movable between an open position in which the valve element is positioned a spaced distance from the valve seat to permit fluid flow through the cavity and a closed position in which the valve element engages the valve seat to block flow through the cavity. The valve further includes a flow varying means positioned in the cavity adjacent the valve element for controlling the flow rate of gaseous fluids from the inlet passage to the outlet passage during movement of the poppet valve. The flow varying means includes an insert and a flow passage formed in the insert, wherein movement of the valve element from the closed to the open position varies the effective cross-sectional flow area of the flow passage.

Attached to the valve housing is an integral spring seat cap which encloses a spring means and provides a positive force on the valve element to maintain a seal between the valve head and valve seat. The flow control valve further comprises a sensing means rigidly attached to the integral spring seat cap. In addition, the flow control valve includes either an apertured insert or a tapered insert positioned adjacent the cylindrical housing, both inserts having a cylindrical shape. The apertured insert includes circular apertures formed in the wall of the insert which are aligned with the outlet passage for permitting fluids to flow therethrough. The tapered insert has a first and second opening with a flow varying surface therebetween. The flow varying surface has a predetermined shape such that movement of the valve element along the flow varying surface varies an effective cross-sectional flow area of the flow passage so as to achieve a predetermined flow rate.

BRIEF DESCRIPTION OF THE DRAWINGS

FIG. 1b is a side elevational view of the radial-hole insert of the preferred embodiment at 1b—1b of FIG. 1a;

FIG. 4a is an exploded elevational view of a valve stem positioned relative to a tapered insert in accordance with the second embodiment of the present invention;

FIG. 4b is an exploded elevational view of a valve stem positioned relative to a variable tapered insert in accordance with a third embodiment of the present invention;

DETAILED DESCRIPTION OF PREFERRED EMBODIMENTS

Figure 1A:
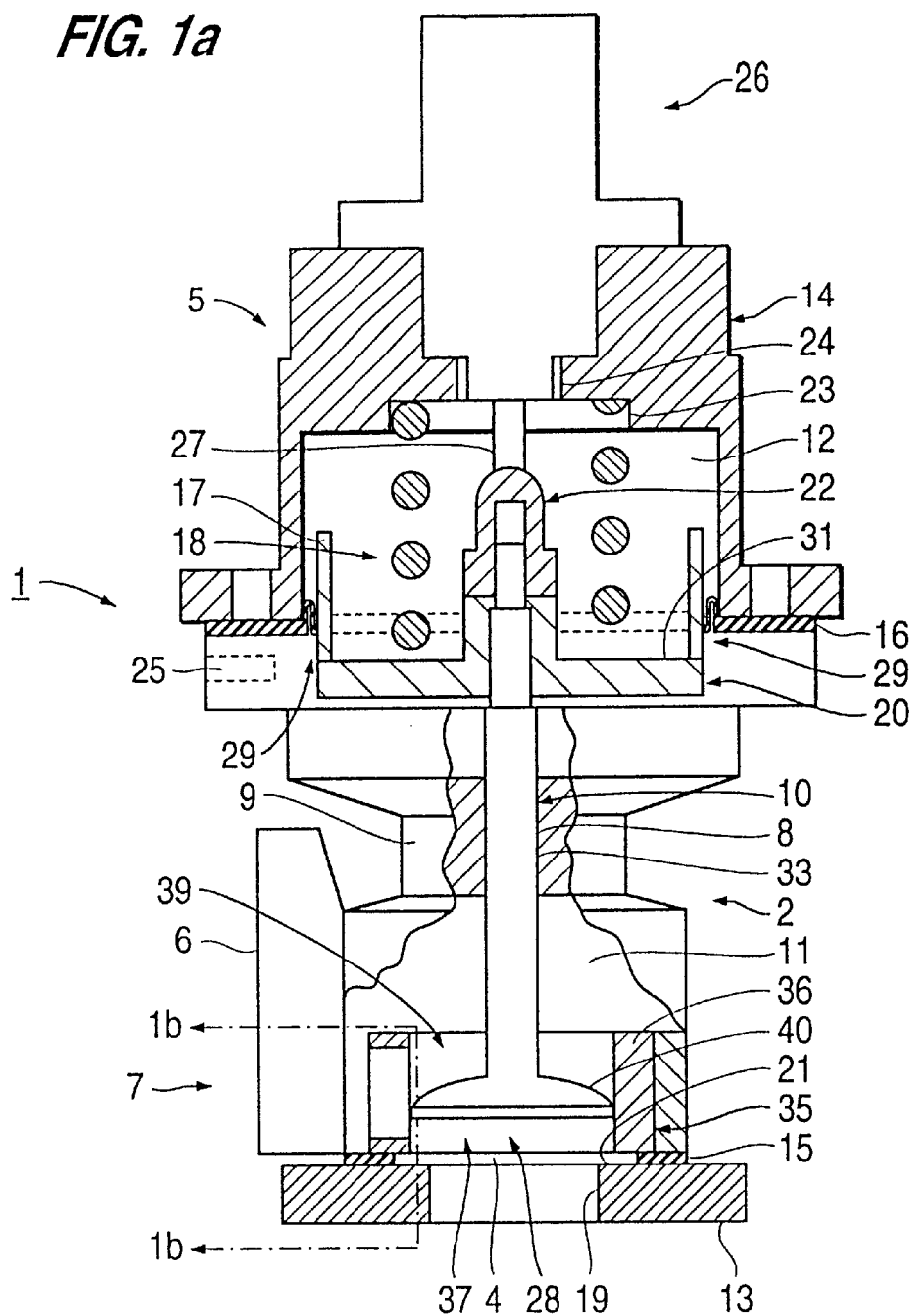
FIG. 1a is a partial cross-sectional view of an exhaust gas recirculation (EGR) valve with a radial-hole insert in accordance with a preferred embodiment of the present invention.

The present invention is directed to an exhaust gas recirculation (EGR) valve for an internal combustion engine which provides improved EGR flow control. The preferred embodiment includes a reciprocally mounted poppet-type valve for providing optimum EGR flow control in a variety of conditions. The present invention allows a user to design the input/output characteristics of the EGR valve specifically for the needs of a particular system. In this context, the "input" to the poppet-type valve is its linear travel or lift, while its "output" is the amount of effective flow area through the valve at a given position. The valve's effective flow area directly influences the flow rate of the EGR valve and hence the degree to which both NOx emissions are reduced and other characteristics, such as particulate emissions and fuel economy, are positively influenced.

Referring now to the drawings, the preferred embodiments of the present invention will be discussed in detail.

The structure of the present invention will be described with reference to FIGS. 1–4 and its characteristics during operation will be explained using graphical data illustrated in FIGS. 5–7.

FIG. 1a illustrates an EGR valve 1 in accordance with the preferred embodiment of the present invention. EGR valve 1 includes a valve housing 2, including an upper portion 5 forming an upper cavity 12 and a lower portion 7 connected to upper portion 5 in a conventional manner. Lower portion 7 includes a lower cavity 11 and a cylindrical bore 8 formed in a neck portion 9 and extending between upper cavity 12 and lower cavity 11. Lower portion 7 also includes an inlet passage 4 and an outlet passage 6 which allows gaseous fluids to flow into and out of lower cavity 11. In a preferred embodiment, gaseous fluids flow from inlet passage 4 to outlet passage 6, however, in an alternative embodiment, the inlet and outlet passages may be reversed such that fluid flows from outlet passage 6 to inlet passage 4 as illustrated in FIG. 1a. One skilled in the art should recognize that even though the flow pattern of the preferred embodiment is discussed herein with regard to the present invention, the flow pattern of the alternative embodiment described above is within the scope of this invention and may be preferred in particular applications depending on the desired flow characteristics of EGR valve 1.

Valve housing 2 also includes a mating flange 13 with a valve gasket 15 interposed therebetween. Valve gasket 15 is compressed between valve housing 2 and mating flange 13 in order to provide an effective seal to prevent leakage of fluid at high engine pressures. Leakage of fluid during engine operation can undesirably affect engine efficiency and power. Mating flange 13 is attached to an external structure (not shown) in a conventional manner and has a ring shape in the preferred embodiment of the invention. A center hole 19 of mating flange 13 directs fluid flow into inlet passage 4. An annular portion of the top surface of mating flange 13 positioned adjacent inlet passage 4 forms a valve seat 21.

EGR valve 1 further includes a valve element 10 reciprocally mounted in upper cavity 12. Valve element 10 includes a valve stem 33 which extends through neck portion 9 and into lower cavity 11, and a valve head 40 formed on the lower portion of valve stem 33. Valve head 40 is disc-shaped and may be formed from the same material as valve stem 33. The valve element is movable between an open position in which valve head 40 is positioned a spaced distance from valve seat 21, as shown in FIG. 1a, to permit fluid to flow through lower cavity 11, and a closed position in which valve element 10 engages valve seat 21 to block flow through lower cavity 11.

Upper portion 5 of valve housing 2 includes an integral spring seat cap 14 that is rigidly attached to lower portion 7 to form upper cavity 12. Compressed between integral spring seat cap 14 and valve housing 2 is a gasket 16 for creating a seal to prevent leakage of fluid from valve housing 2. The upper portion of valve element 10 is positioned in upper cavity 12 in a manner which allows only reciprocating linear movement. Valve element 10 is attached to a piston 20 and a retainer nut 22 which reciprocate with valve element 10 during movement of the valve from a closed position to an open position. Also included in upper cavity 12 is a spring 18 which is axially positioned within upper cavity 12. Integral spring seat cap 14 includes a recessed portion 23 for receiving spring 18 at one end. Piston 20 includes an annular wall 17 to form a cup-shape which allows the other end of spring 18 to fit securely within its inner cavity 31 in a compressive abutment. When spring 18 compresses, annular wall 17 of piston 20 act as spring stops against integral spring seat cap 14 to allow valve element 10 to travel only a predetermined distance when moving towards an open position.

In the preferred embodiment of the present invention, EGR valve 1 is actuated by air pressure which moves a diaphragm 29 attached to gasket 16 and piston 20 between a first and second position. In order for valve element 10 to move from a closed position to an open position to control fluid flow rate, air pressure is supplied into a port 25 formed in valve housing 2 which provides a pressure against the bottom of diaphragm 29 sufficient to overcome the resistive force of spring 18. As the air pressure increases, diaphragm 29 and piston 20 move in an upward direction towards integral spring seat cap 14. To move valve element 10 towards a closed position, the air pressure forcing diaphragm 29 upward is released through port 25. At this point, the resistive force of spring 18 is sufficient to force piston 20 downward until valve element 10 engages valve seat 21. In certain embodiments, such as the valve structure shown in FIG. 4b, the spring biases the valve element so that the back surface of the valve head seats and seals the valve in a closed position. In this embodiment, the valve is opened by actuating the valve element downward, away from the valve seat. One skilled in the art should recognize that any actuation means (i.e., solenoid, hydraulic, etc.) may be used with this invention to control reciprocal movement of valve element 10.

Integral spring seat cap 14 includes an opening 24 at its uppermost end for receiving a linear position sensor 26 which serves as a potentiometer or a similar type of linear position sensor for EGR valve 1. Sensor 26 threadingly engages integral spring seat cap 14 and abuts retainer nut 22, which also serves as a position sensor contact, via extension 27 reciprocally attached to the base of linear position sensor 26. Retainer nut 22 is positioned directly above piston 20 and is connected to the top portion valve element 10 in a conventional manner.

Linear position sensor 26 records the movement of valve element 10, during operation of EGR valve 1, to track its movement and position relative to valve seat 21. This data is useful for determining whether EGR valve 1 is in an open or closed condition and is also essential in calculating valve lift for achieving the desired flow characteristics of the valve structure. For example, if linear flow characteristics are desired, the valve stem may have a 25% lift (compared to a maximum lift of 100%) to achieve a flow area of 25% (compared to a maximum flow area of 100%). By regulating the lift or position of the valve element 10, EGR valve 1 can accurately control the rate of gaseous fluid that is able to flow from inlet passage 4 and through outlet passage 6. The position of valve element 10 is controlled by movement of diaphragm 29 which is repeatable over time, thus, allowing the valve to maintain a repeatable control scheme.

EGR valve 1 further includes a flow varying device 35 including an insert 36 having a flow passage 28 for permitting the flow of gaseous fluids from inlet passage 4 to outlet passage 6. Insert 36 is a cylindrically shaped element secured within lower cavity 11 by a slip fit and is positioned adjacent valve element 10. In order to prevent insert 36 from rotating within lower cavity 11, a set screw may be used to secure insert 36 to valve housing 2. For insert designs which rely on proper aperture alignment with outlet passage 6 to control fluid flow rate, a set screw or a similar fastening means would be necessary.

Figure 1B:
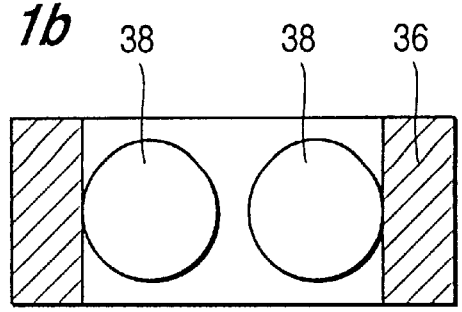

Insert 36 is removable from valve housing 2 and may have various geometrical shapes and flow passages to create a vast spectrum of controlled flow configurations through EGR valve 1. Insert 36 includes a first opening 37 positioned adjacent inlet passage 4 of the valve housing 2 and a second opening 39 opposed to first opening 37 thus, defining flow passage 28 therebetween. In a preferred embodiment, insert 36 includes two apertures 38 which are formed in the wall of insert 36, as shown in FIG. 1b. In this embodiment, the apertures have a circular shape. In a second preferred embodiment, the insert may have a tapered inner wall, as discussed in further detail below, or different shaped apertures formed in the wall of the insert. In addition, the insert may have one or more apertures positioned along a similar radial plane in the insert or along different planes, depending the flow characteristics desired from EGR valve 1.

Valve head 40 moves within the inner radial extent of insert 36 as clearly illustrated in FIG. 1a. The valve head 40 forms a close sliding fit with the inner wall of insert 36 to create a fluid seal as valve element 10 moves within flow passage 28, thereby, preventing the flow of fluid from first opening 37 through second opening 39. The blockage of fluid flowing through the second opening of the insert forces the fluid to flow through an effective cross-sectional area of the apertures formed in insert 36 based on the position of valve element 10. As valve element 10 lifts toward an open position, valve head 40 gradually uncovers a greater portion of apertures 38 to gradually increase the effective cross-sectional flow area through apertures 38 at a predetermined rate.

The shape and position of apertures 38 are crucial for controlling the rate at which the effective flow area of apertures 38 increases. Conventional poppet valves have a tendency to open rapidly, with respect to effective flow area, during the initial range of valve head travel, that is, when the valve head begins to move away from the valve seat to allow fluid to flow therebetween. Consequently, the rate at which the effective flow area increases with lift falls. The present invention utilizes aperture geometries and position to control the rate at which the effective flow area increases with valve lift. FIG. 1b shows insert 36 with two apertures which are formed adjacent one another. Nevertheless, insert 36 may be designed with larger or smaller apertures or apertures formed in different patterns in the insert. In essence, the aperture size and position may be altered to achieve the desired flow rate control.

Figure 2:
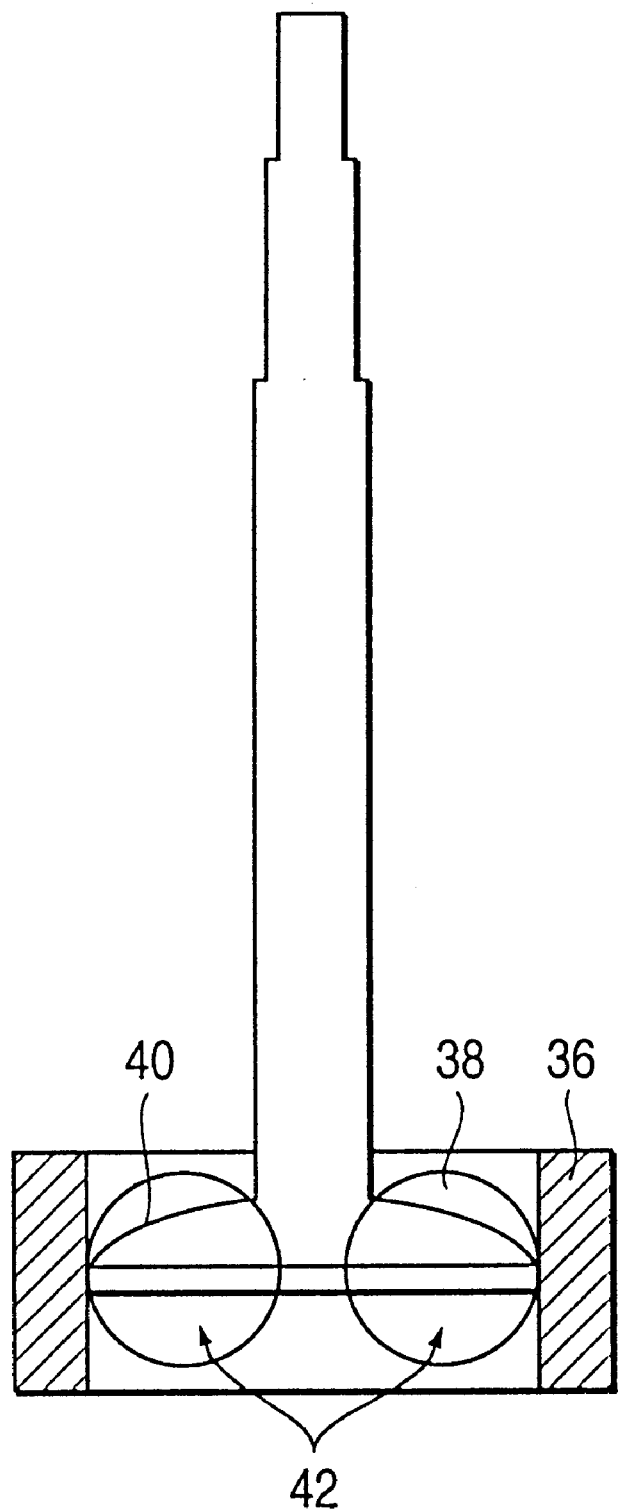
FIG. 2 is an exploded elevational view of a valve stem positioned relative to a radial-hole insert in accordance with a preferred embodiment of the present invention as shown in FIGS. 1a and 1b.

FIG. 2 shows an exploded view of valve head 40 with respect to insert 36 and apertures 38. As shown by this figure, valve head 40 moving across apertures 38 in an upward direction varies flow area 42 of each of the two apertures 38 substantially equally. The shape of apertures 38 control the amount of fluid allowed to flow through the apertures, while the valve lift controls the effective flow area. The circular apertures of insert 36 allow for a fine degree of control during the initial range of valve head travel since only the very bottom portions of the apertures defining a small flow area are exposed to allow fluid to flow therethrough. If apertures 38 were square and the valve lift relative to the circular apertures is equal, more fluid would be able to pass through the square aperture than the circular aperture due to a wider flow area at its bottom portion. Therefore, a circular aperture provides greater control of flow rate at the initial range of valve head lift a square aperture, for example, or other similarly shaped aperture. The flow characteristics of the apertures used in the preferred embodiments of the present invention are graphically represented in FIG. 5 which is discussed in further detail below.

Figure 3:
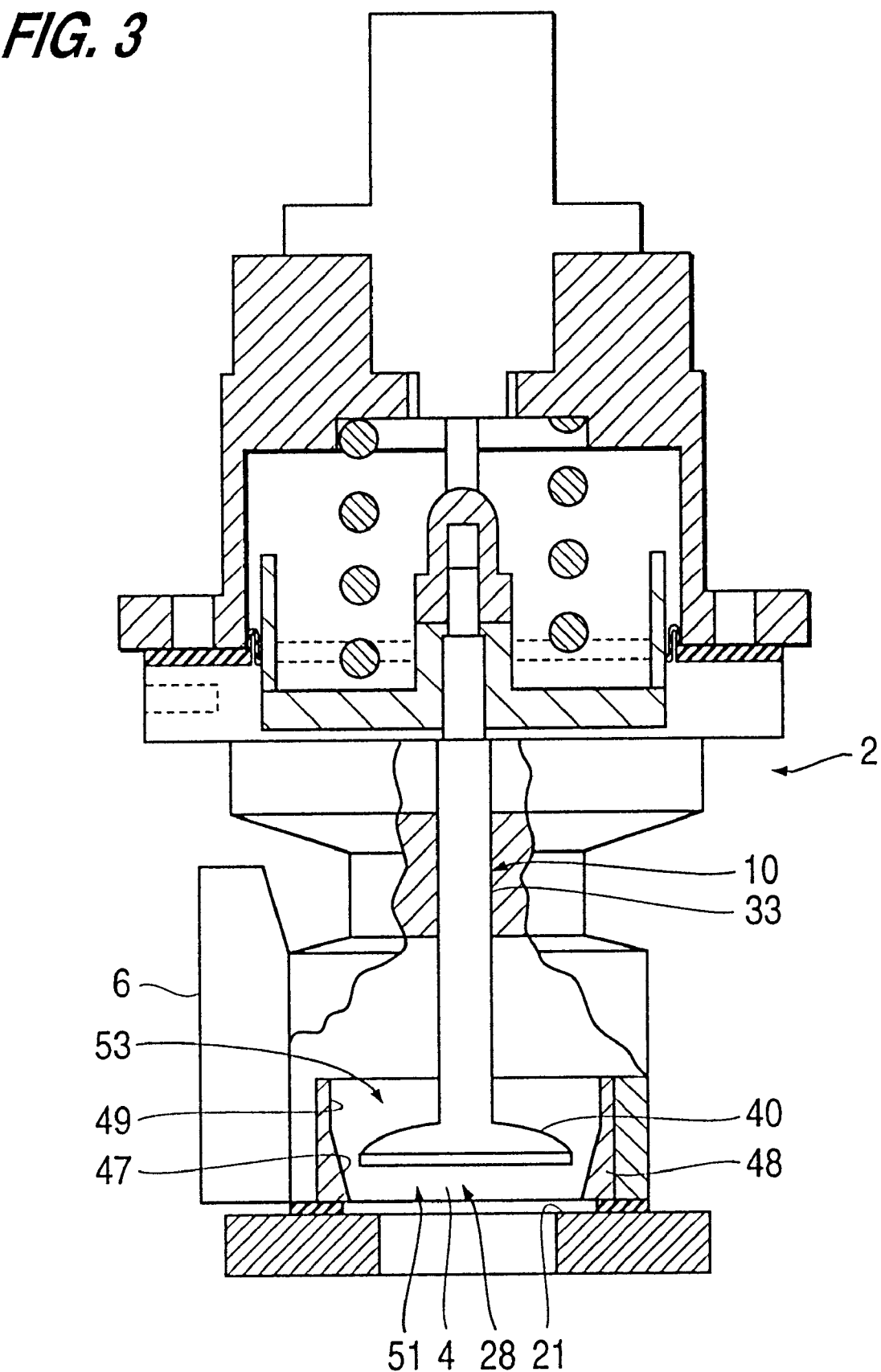
FIG. 3 is a partial cross-sectional view of an EGR valve with a tapered insert in accordance with a second embodiment of the present invention.

FIG. 3 illustrates a second preferred embodiment of the present invention which includes a similar valve structure to that shown in FIG. 1, however, the flow varying device includes a tapered insert 48 positioned in the lower cavity of valve housing 2. Tapered insert 48 is very similar to apertured insert 36 (illustrated in FIG. 1) in that both inserts are removable and cylindrical. Tapered insert 48 may be secured into valve housing 2 by a slip fit without the need for a set screw. In addition, like apertured insert 36, tapered insert 48 is positioned downstream of valve seat 21 for altering the flow of fluid between inlet passage 4 and outlet passage 6.

Tapered insert 48 includes a first opening 51 for receiving fluid from inlet passage 4 and directing the fluid flow into flow passage 28, and a second opening 53 positioned downstream of first opening 51 for directing the fluid flow to outlet passage 6. Tapered insert 48 differs from insert 36 by including a flow varying surface 47 extending between the first and second openings. Flow varying surface 47 encircles valve head 40 when the valve head is positioned between the first and second openings to define a flow path or radial gap in flow passage 28 between flow varying surface 47 and valve head 40. Flow varying surface 47 has a predetermined shape such that the movement of the valve head along flow varying surface 47 toward an open position varies the effective cross-sectional flow area of the radial gap of flow passage 28 in order to achieve a predetermined rate of increase in the flow rate of the fluid passing therethrough.

Flow varying surface 47 of tapered insert 48 includes a frusto-conical or tapered shape. However, the shape of flow varying surface may be altered in order to increase or decrease the amount of gaseous fluid able to flow through the radial gap. For example, if an increased flow rate is desired even after the valve element is at maximum lift, then the larger diameter portion 49 of tapered insert 48 may be increased to allow a greater volume of fluid to flow therethrough.

FIG. 4a shows an exploded view of valve head 40 in relation to flow varying surface 47 of tapered insert 48, in accordance with the second preferred embodiment of the invention. This figure illustrates an axial gap 52 between valve head 40 and valve seat 21 (illustrated in FIGS. 1 and 3) and a radial gap 54 between flow varying surface 47 and the outer annular edges of valve head 40 to control gaseous fluid flow. Please note that the distances of FIG. 4a are not drawn to scale and are merely shown to define the meanings of axial and radial gap in the present invention.

Referring to FIG. 4a, as valve element 10 is lifted from valve seat 21 (shown in FIGS. 1 and 3), both axial gap 52 and radial gap 54 increase. Axial gap 52 controls the flow of gaseous fluids during the early part of valve stem lift, while radial gap 54 controls the flow area at lifts greater than the initial range of lift. The amount of control, if any, of the axial and radial gaps during valve operation will vary depending on the size and shape of flow varying surface 47 and its position relative to valve head 40. The distinctions between the various sizes and shapes of the flow varying surface are discussed in further detail with regard to FIGS. 6 and 7. As valve head 40 moves along flow varying surface 47 of tapered insert 48 toward an open position, the effective cross-sectional area of flow passage 28 is varied to achieve a predetermined increase in the fluid flow rate. The flow rate is controlled based on the effective flow area between valve head 40 and flow varying surface 47. Therefore, assuming the size of valve head 40 remains constant, a user may simply vary the shape of flow varying surface to obtain the desired flow characteristics for EGR valve 1.

A variation of tapered insert 48 used in EGR valve 1 is illustrated in FIG. 4b. Variable tapered insert 61 includes a flow varying surface 62 similar to flow varying surface 47 described above but having an inverted orientation with respect thereto. In this embodiment, the actuation means is similar to that of the preferred embodiments discussed above, however, valve element 10 is biased against valve seat 63 in a closed position and extends downward towards an open position to effectively control the flow rate of fluid from first opening 69 through second opening 71 via radial gap 68. This embodiment may be preferred for certain applications requiring a back-seated valve structure for flow control.

As described above in reference to the first and second preferred embodiments of the present invention, two types of inserts are used in valve housing 2 for varying the flow characteristics of a valve system. With apertured insert 36, the flow is controlled based on the effective cross-sectional area of aperture 38 that is exposed by valve head 40 while the valve is being lifted, as shown in FIG. 2. However, with tapered insert 48, flow is controlled based on the defined flow area or axial gap between valve head 40 and valve seat 21 and the radial gap between valve head 40 and flow varying surface 47 as the valve head is lifted.

Figure 5:
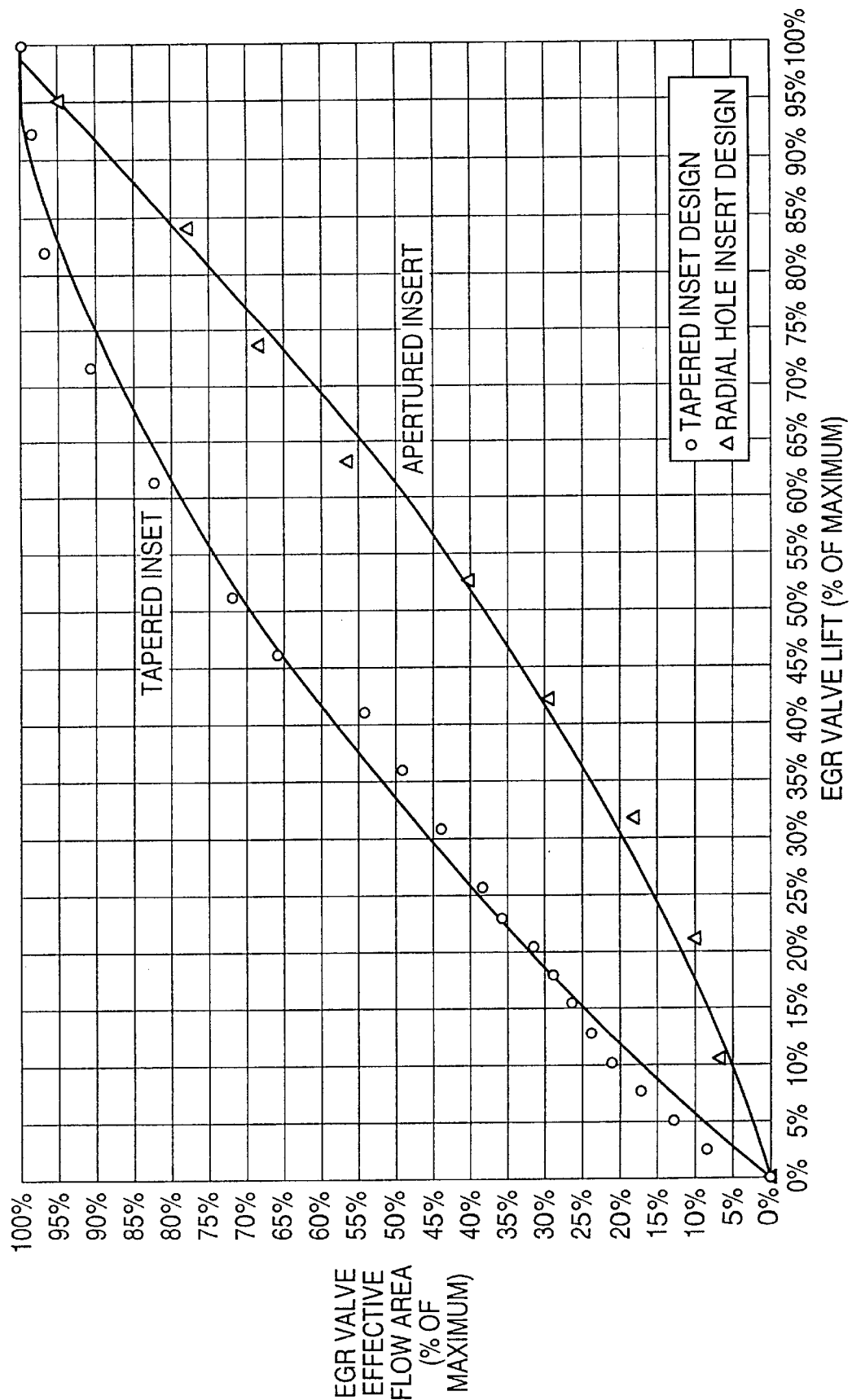
FIG. 5 is a graph of an EGR valve lift percentage versus an EGR valve effective flow area percentage for the radial-hole insert and the tapered insert of the present invention.

FIG. 5 illustrates a graph representing EGR valve effective flow area percentages versus EGR valve lift percentages for both apertured insert 36, as well as tapered insert 48. This figure provides a graphical representation of flow characteristic data specifically for the two insert designs of the first and second preferred embodiments. Using the mathematical data from FIG. 6, the relationship of the graph to valve operation is described as follows: if Z is the lift of the valve and A is the effective flow area of the valve, then the rate of change or "gain" of the valve will vary, dependent on the lift of the valve. For the apertured insert, the curve is concave upward and the gain is low at low lifts and increases through the entire lift range, as illustrated in FIG. 5. This would be very useful for system architecture that needs a fine degree of control at low lifts or flow areas, and perhaps needs a large range of flow area and can tolerate a coarser control near the top end of travel. The gain of the tapered insert is higher as compared to the apertured insert when the lift of the valve stem is low. As the lift of the valve stem increases, the tapered insert flow area also increases. However, the flow area begins to taper off after the valve is lifted up to around 40% of its maximum lift. The graphical data of FIG. 5 illustrates that the tapered insert allows a larger flow area as the valve lifts than the apertured insert. Nevertheless, the rate of change or gain of the tapered insert decreases as the valve lift is greater than 50%. As can be further seen from the graph, however, the apertured insert provides for more accurate control of flow during initial valve stem lift or opening of EGR valve 1. Both inserts provide a significant amount of flexibility for a user to create an appropriate flow control valve structure for suiting specific EGR needs.

Figure 6:
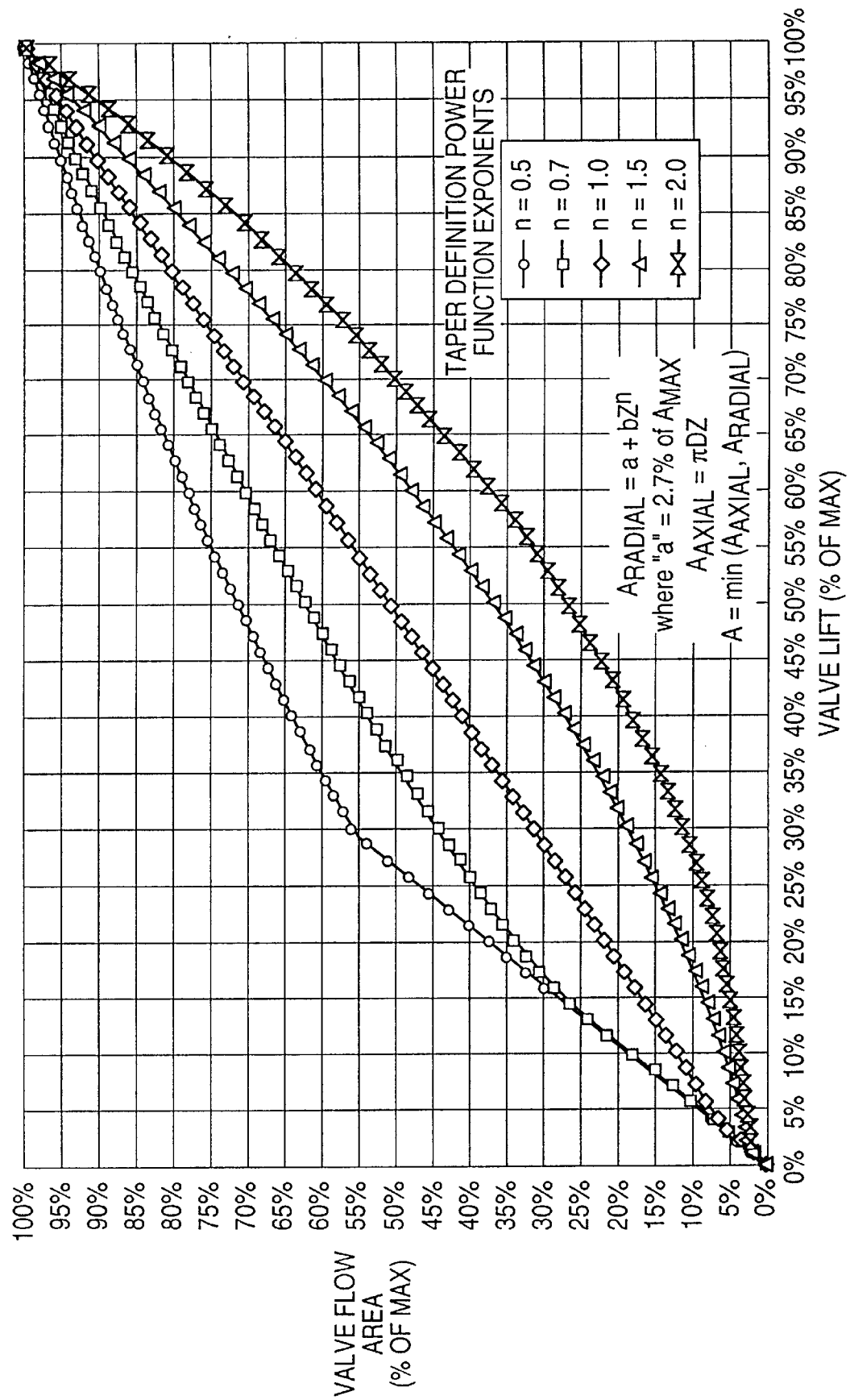
FIG. 6 is a graph of an EGR valve flow area percentage versus a valve lift percentage for a variety of tapered insert designs.

FIG. 6 graphically represents a variety of tapered insert designs and their respective effective flow area schedules to generate a range of flow control characteristics. Each curve corresponds to one tapered insert design. Specifically, FIG. 6 shows the valve flow area percentage versus the valve lift percentage of the tapered insert used in the EGR valve of the second preferred embodiment. The legend of FIG. 6 illustrates power function exponents which may be used to alter the graphical representation of the flow rate for the tapered insert design. The mathematical representation of each curve is $A = \min(A_{axial}, A_{radial})$, where "A" represents the effective flow area of the valve, "$A_{axial}$" represents the axial valve lift percentage, and "$A_{radial}$" represents the valve flow area based on the radial gap between valve head 40 and the flow varying surface 47 of the insert.

The $A_{axial}$ value is calculated as follows:

$A_{axial} = \Pi D Z$, where "D" represents the diameter of the valve head and "Z" represents the lift of the valve stem during EGR valve 1 operation.

The $A_{radial}$=value is calculated as follows:

$A_{radial} = a + bZ^n$, where "a" is the diameter of the tapered inner walls of the insert at the minimum diameter which equals 2.7% of $A_{max}$ or the maximum flow area of the EGR valve; "b" is a coefficient representing how the taper diameter increases with valve stem lift; "Z" represents the lift of the valve stem; and "n" is an exponent representing the unique taper definition for each insert represented on the graph of FIG. 6. The value of $A_{axial}$ is represented on the Y-axis of the graph and the value of $A_{radial}$ is represented on the X-axis of the graph.

The design of the tapered insert lends itself to more flexibility than the apertured insert design with regard to the range of flowability. Using the range parameters discussed above and noted in the legend of FIG. 6, a user can design: (a) concave downward flow characteristic shapes for situations demanding rapid initial openings and finer control at the top end of the valve lift (n<1.0), (b) fully linearized flow characteristic shapes where the user desires linearized flow control (n=1.0), or (c) concave upward flow characteristic shapes where fine control at the bottom end is needed at the expense or coarser control at the top end (n>1.0). The tapered insert designs graphical represented in FIG. 6 have minimum flow varying surface diameters slightly greater than the diameter of the valve head, thus allowing minimal fluid flow when the valve is initially opened.

Figure 7:
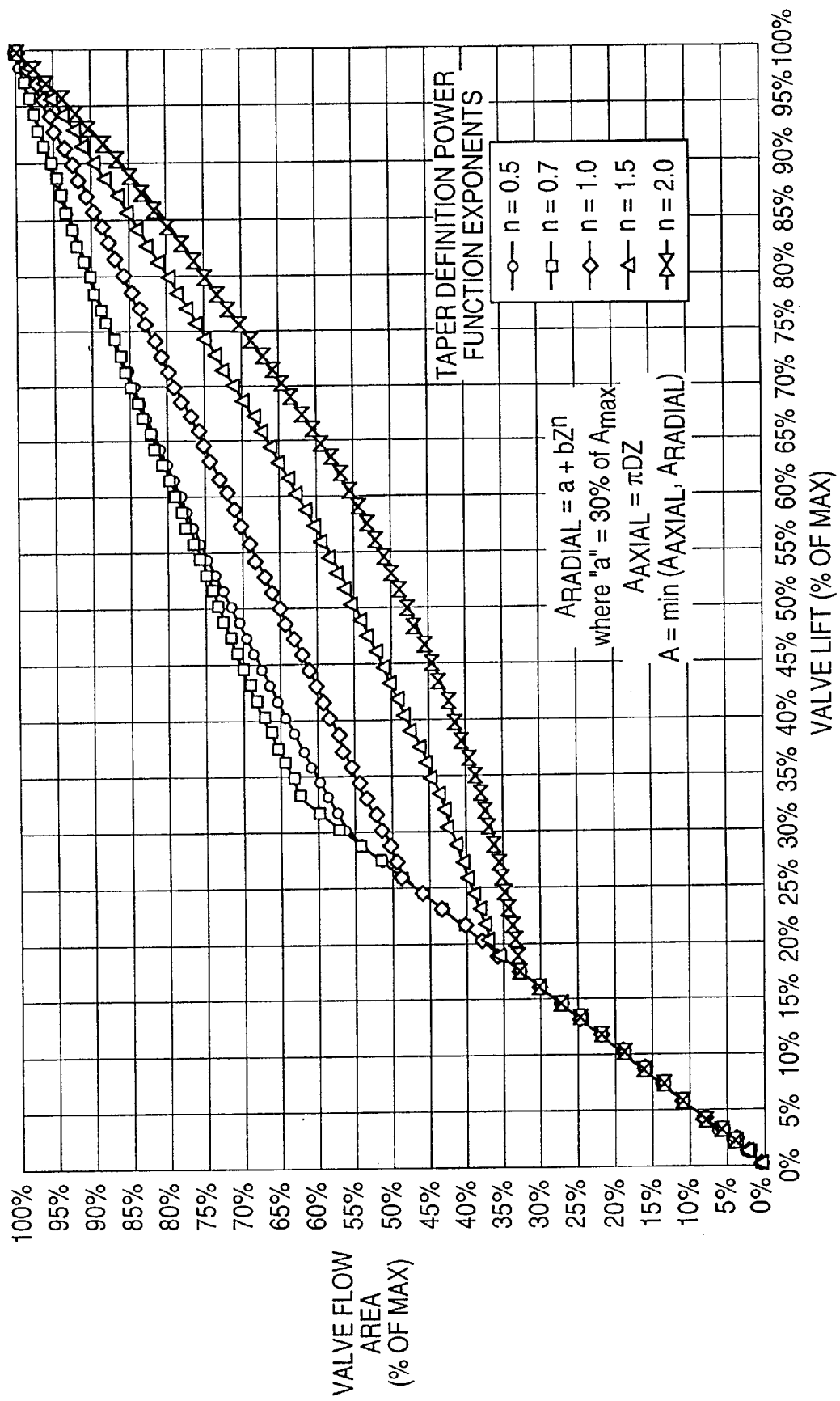
FIG. 7 is a graph of an EGR valve flow area percentage versus a valve lift percentage for a variety of tapered insert designs where the minimum diameter of the taper is somewhat greater than the diameter of the poppet head and the inserts graphically represented in FIG. 6.

FIG. 7 represents valve flow area percentage versus valve lift percentage of a tapered insert design used with EGR valve 1 where the minimum diameter of the taper is a predetermined amount greater than the diameter of the valve head and therefore, the initial flow area opens up most rapidly, being controlled only by the axial gap in an extended initial opening period. For example, in FIG. 6 the tapered insert design with a taper definition exponent of n=1.0, i.e. a flat linear taper with a minimum diameter yielding a radial flow of 30% of the maximum flow area (this is the middle curve of the five curves), the flow area opens up to 50% of its maximum in the initial 25% of lift, leaving the upper 50% of flow area to be controlled in the remaining 75% of lift. For finer control at higher lifts, a tapered insert having taper definition exponent of n=0.5 (the top curve) will provide greater control of the flow rate by controlling the flow through the radial gap between the valve head 40 and flow varying surface 47 when the valve is above 50% lift. By simply varying the inner surface of tapered insert 48 a user can customize EGR valve 1 to match the desired valve characteristics to the specific engine system architecture.

As can be seen by FIG. 7, the initial valve flow area and valve lift percentages are essentially linear for all varieties of the tapered insert design due to the initial radial gap between the valve head and the flow varying surface of the insert. However, the valve flow area tapers off after the valve lift percentage exceeds that of about 17% for the first tapered design (n=2.0) and up to about 33% of the last tapered design (n=0.5). These particular flow characteristics may be desired for greater control of the flow areas at high lift conditions. The design of EGR valve 1 provides greater controllability over a period of time than the existing EGR valve designs due to the ability to modify the flow characteristics of the valve structure using different inserts. The present invention allows a user to select an insert design that meets the desired amount of flow control for a particular engine environment.

INDUSTRIAL APPLICABILITY

The flow control valve of the present invention may be employed in any environment where it is essential to achieve a more desirable characteristic of exhaust gas recirculation flow control. Moreover, the flow control valve may be utilized where it is desirable to design the input/output characteristics of the valve specifically for the needs of a particular system. Furthermore, the flow control valve may be used to control the degree to which Nox emission are reduced and other characteristics of interest, such as particulate emission and fuel economy, are influenced.

What is claimed is:

1. An exhaust gas recirculation (EGR) valve for an internal combustion engine for controlling the flow of exhaust gas into a cylinder combustion chamber comprising:
   a valve housing having a cavity, an inlet passage and an outlet passage;
   a poppet valve positioned in said cavity and including a reciprocally mounted valve element and a valve seat, said valve element including a valve stem and a valve head integrally formed on said valve stem, said poppet valve being movable between an open position in which said valve element is positioned a spaced distance from said valve seat to permit exhaust gas flow through said cavity and a closed position in which said valve element engages said valve seat to block exhaust gas flow through said cavity;
   a bias means for providing a positive force on said valve stem to create a seal between said valve head and said valve seat; and
   an exhaust gas flow varying means positioned in said cavity adjacent said valve element for controlling the exhaust gas flow rate from said inlet passage to said outlet passage during movement of said poppet valve, said exhaust gas flow varying means including an insert and a flow passage formed in said insert, said insert including an inlet opening for receiving exhaust gas from said inlet passage and directing the exhaust gas flow into said flow passage, and an outlet opening for directing the exhaust gas flow from said flow passage to said outlet passage;
   wherein movement of said valve element from said closed to said open position varies the effective cross-sectional flow area of said flow passage, said insert including a tapered inner extent such that said inlet opening has a different diameter than said outlet opening, and said insert is separably replaceable from said valve seat which is engaged by the valve element in said closed position.

2. An exhaust gas recirculation (EGR) valve for an internal combustion engine for controlling the flow of exhaust gas into a cylinder combustion chamber comprising:
   a valve housing having a cavity an inlet passage and an outlet passage;
   a poppet valve positioned in said cavity and including a reciprocally mounted valve element and a valve seat, said valve element including a valve stem and a valve head integrally formed on said valve stem, said poppet valve being movable between an open position in which said valve element is positioned a spaced distance from said valve seat to permit exhaust gas flow through said cavity and a closed position in which said valve element engages said valve seat to block exhaust gas flow through said cavity;
   a bias means for providing a positive force on said valve stem to create a seal between said valve head and said valve seat; and
   an exhaust gas flow varying means positioned in said cavity adjacent said valve element for controlling the exhaust gas flow rate from said inlet passage to said outlet passage during movement of said poppet valve, said exhaust gas flow varying means including an insert and a flow passage formed in said insert, said insert including an inlet opening for receiving exhaust gas from said inlet passage and directing the exhaust gas flow into said flow passage, and an outlet opening for directing the exhaust gas flow from said flow passage to said outlet passage;
   wherein movement of said valve element from said closed to said open position varies the effective cross-sectional flow area of said flow passage said insert including a tapered inner extent such that said inlet opening has a different diameter than said outlet opening, and said insert further includes a substantially straight portion in addition to said tapered inner extent.

3. An exhaust gas recirculation (EGR) valve of claim 2, wherein said substantially straight portion defines said outlet opening, said outlet opening having a smaller diameter than said inlet opening.

4. An exhaust gas recirculation (EGR) valve of claim 2, wherein said substantially straight portion defines said outlet opening, said outlet opening having a larger diameter than said inlet opening and said insert is separably replaceable from said valve seat which is engaged by the valve element in said closed position.

5. An exhaust gas recirculation (EGR) valve for an internal combustion engine for controlling the flow of exhaust gas into a cylinder combustion chamber comprising:

a valve housing having a cavity formed therein;

an inlet means formed in said valve housing for directing exhaust gas into said cavity;

an outlet means formed in said valve housing for receiving exhaust gas from said cavity;

a valve means reciprocally mounted in said cavity for controlling fluid flow from said inlet means to said outlet means, said valve means including a valve head, a valve seat, and a cap, said valve head being movable between an open position in which said valve head is positioned a spaced distance from said seat to permit exhaust gas flow through said cavity and a closed position in which said valve head engages said valve seat to block exhaust gas flow through said cavity;

a sensing means attached to said cap for sensing the position of said valve means to provide an indication of the position of said valve head relative to said valve seat; and a flow varying means positioned adjacent said valve head downstream of said valve seat for altering the flow rate of fluid between said inlet means and said outlet means, said flow varying means including a first opening, a second opening positioned downstream of said first opening and a flow varying surface extending between said first and second openings and encircling said valve head when said valve head is positioned between said first and said second openings to define a flow passage between said flow varying surface and said valve head, said flow varying surface having a predetermined shape such that movement of said valve head along said flow varying surface toward said open position varies an effective cross sectional flow area of said flow passage so as to achieve a predetermined rate of increase in the flow rate of exhaust gas;

wherein said movement of said valve head is continuously monitored by said sensing means and is controlled based on operating conditions of said internal combustion engine, said flow varying means including a removable insert, said flow varying surface being formed on said insert and having a frusto-conically shaped portion and a substantially tubular portion.

6. An exhaust gas recirculation (EGR) valve of claim 5, wherein said substantially tubular portion defines said outlet opening, said outlet opening having a smaller diameter than said inlet opening.

7. An exhaust gas recirculation (EGR) valve of claim 5, wherein said insert is separably replaceable from said valve seat which is engaged by the valve element in said closed position.

8. An exhaust gas recirculation (EGR) valve of claim 1, wherein said outlet opening is larger than said inlet opening.

9. An exhaust gas recirculation (EGR) valve of claim 1, wherein said inlet opening is larger than said outlet opening.

10. An exhaust gas recirculation (EGR) valve of claim 9, wherein said movement of said valve head is continuously monitored by a sensor and is controlled based on operating conditions of said internal combustion engine.

11. An exhaust gas recirculation (EGR) valve of claim 9, further comprising a sensor for sensing the position of said poppet valve to provide an indication of the position of said valve head relative to said valve seat.

12. An exhaust gas recirculation (EGR) valve of claim 11, further comprising a cap positioned at one end of said poppet valve, said biasing means positioned in seated abutment against said cap.

13. An exhaust gas recirculation (EGR) valve of claim 12, wherein said sensor is attached to said cap.

14. An exhaust gas recirculation (EGR) valve of claim 13, wherein said insert is substantially tubular in shape.

15. An exhaust gas recirculation (EGR) valve of claim 2, further comprising a sensor for sensing the position of said poppet valve to provide an indication of the position of said valve head relative to said valve seat.

16. An exhaust gas recirculation (EGR) valve of claim 15, wherein said insert is separably replaceable from said valve seat.

17. An exhaust gas recirculation (EGR) valve of claim 16, further comprising a cap positioned at one end of said poppet valve, said biasing means positioned in seated abutment against said cap.

18. An exhaust gas recirculation (EGR) valve of claim 17, wherein said sensor is attached to said cap.

19. An exhaust gas recirculation (EGR) valve of claim 18, wherein said insert is substantially tubular in shape and said substantially straight portion defines said outlet opening.

20. An exhaust gas recirculation (EGR) valve of claim 6, wherein said cap is positioned at one end of said poppet valve and said biasing means is positioned in seated abutment against said cap.

* * * * *